Sept. 28, 1937.   W. A. DILLON   2,094,427
VEHICLE DIRECTION SIGNAL
Filed Feb. 10, 1936   2 Sheets-Sheet 1
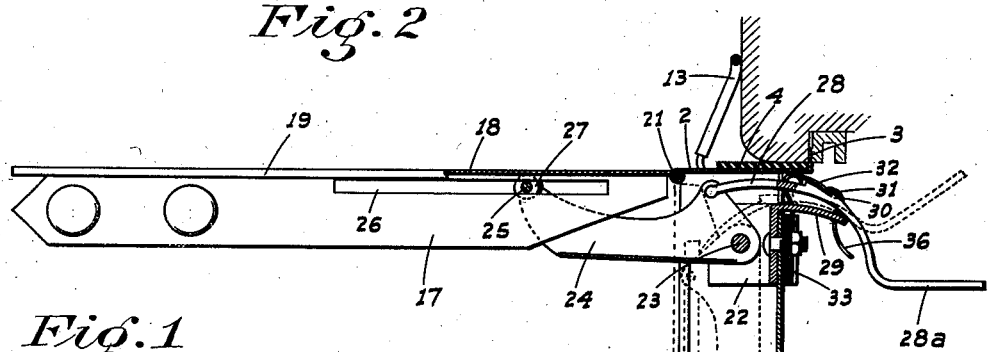
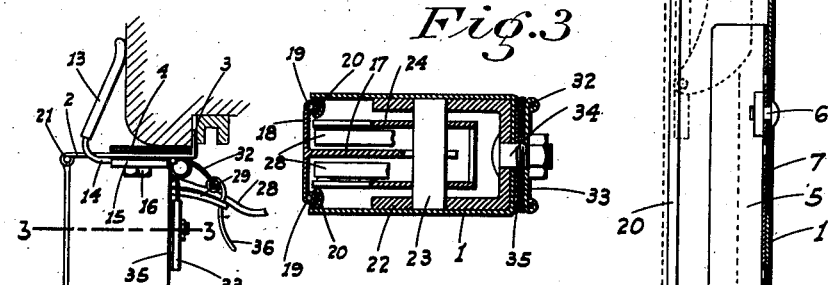
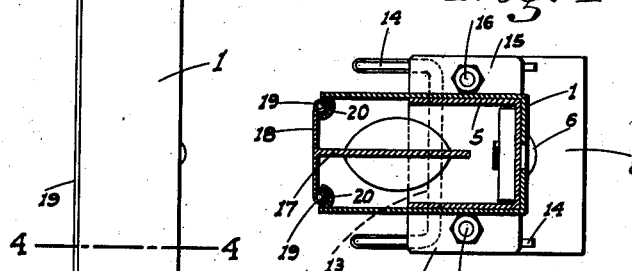
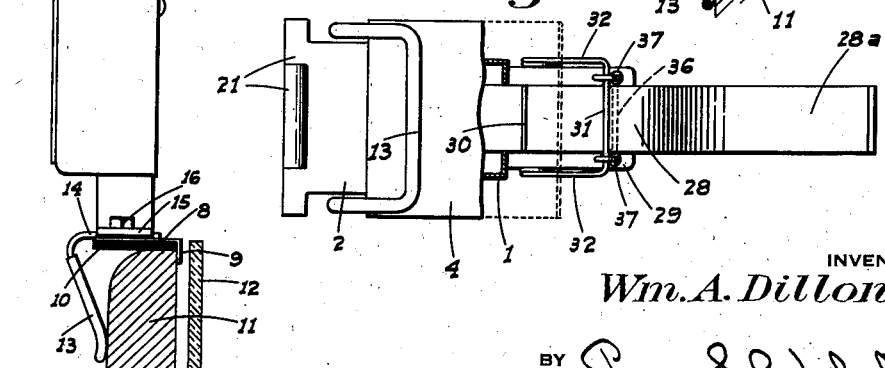
INVENTOR
Wm. A. Dillon
BY
ATTORNEY

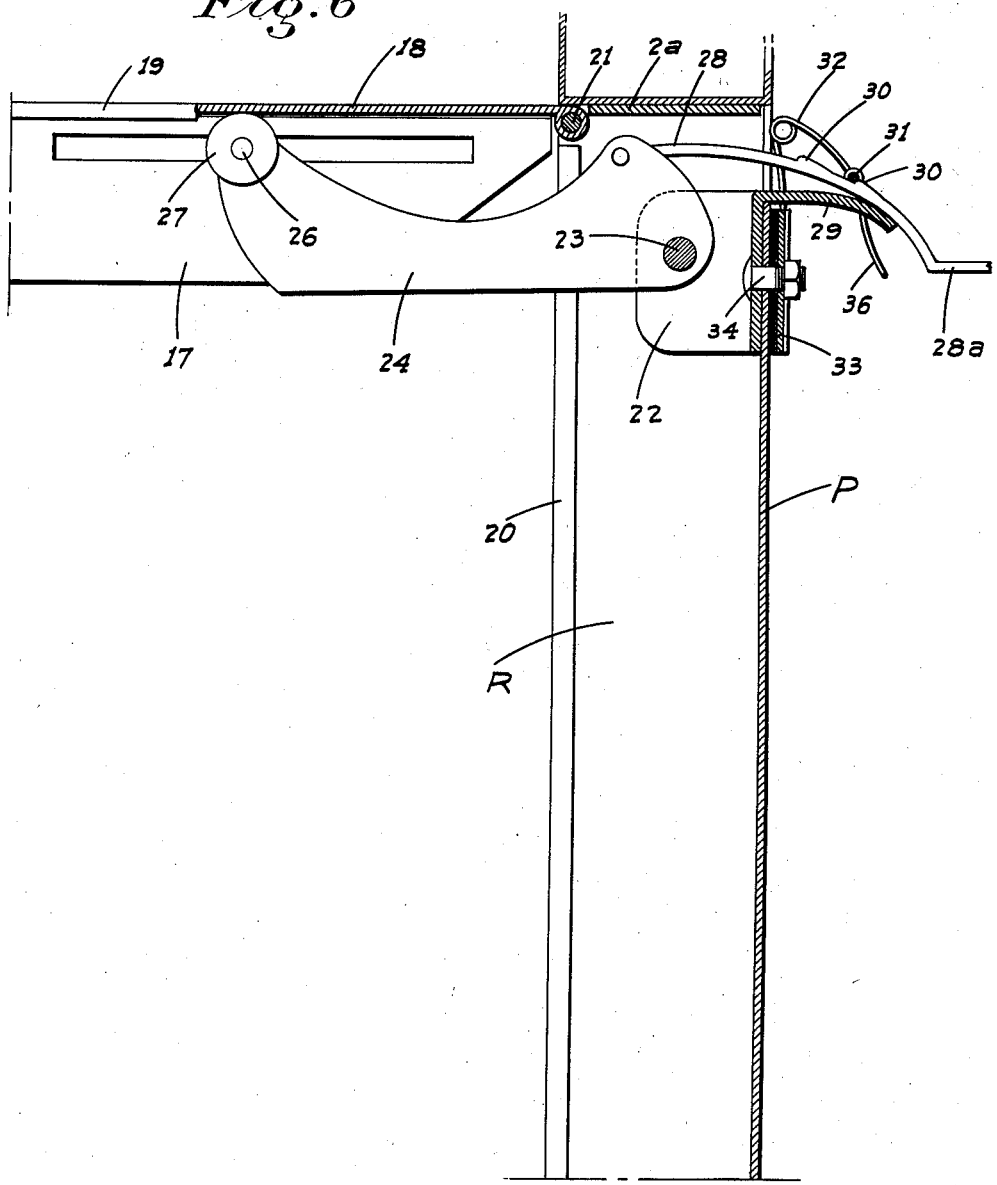

Patented Sept. 28, 1937

2,094,427

UNITED STATES PATENT OFFICE 2,094,427

VEHICLE DIRECTION SIGNAL

William A. Dillon, San Jose, Calif.

Application February 10, 1936, Serial No. 63,210

10 Claims. (Cl. 116—52)

This invention relates to direction signals for motor vehicles, and especially to one particularly designed for use in closed cars.

One of my objects is to provide a signal device of this general character which may be installed on the vehicle in a very few minutes regardless of the particular design of vehicle, and with no work having to be done on the same so that no "installation charge" is necessary when installing the signal. At the same time the signal if put out as factory equipment may be easily built integral with the vehicle.

Another object is to provide a signal device having a manually controlled signal arm which may be quickly and easily moved to a signal position by the driver and as easily returned to a neutral position.

A further object is to provide a device of this character so arranged that when the signal arm is in a neutral position, said arm as well as various control parts for the same are concealed so that they are protected against the elements and a neat appearance of the device as a whole is assured.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a rear elevation of the signal device as installed in connection with a motor vehicle door, the signal arm being in its neutral or inoperative position.

Figure 2 is a sectional elevation of the device showing the arm extended to indicate a left turn.

Figure 3 is a full sized cross section on the line 3—3 of Figure 1.

Figure 4 is a similar view on the line 4—4 of Figure 1.

Figure 5 is a top plan view of the signal device with the top pad partly broken away.

Figure 6 is a fragmentary sectional elevation of the signal as mounted in a recess integral with the vehicle.

Referring now more particularly to the characters of reference on the drawings, the device comprises a channel shaped vertical casing 1 open to the outside of the vehicle. On its upper end this casing is formed with a horizontal plate 2 provided across its inner end with an upstanding lip 3 and covered with a cushion pad 4. The casing is open on the bottom and slidable within the same is a casing extension 5 also channel shaped. This extension is clamped at the back to the back of the casing 1 for vertical adjustment or longitudinal extension by bolts 6 passing through slots 7 in said casing 1. The bottom of the extension is provided with a horizontal plate 8 having a downturned lip 9 across its inner end vertically alined with the lip 3; a cushion pad 10 being disposed over the bottom face of the plate. I thus provide an extension or telescoping casing unit, adapted to be longitudinally adjusted so that the pads 4 and 10 may firmly engage the adjacent horizontal faces of the window opening in the door 11 of the vehicle; the lips 3 and 9 engaging the inner vertical surface of the door above and below the window opening in the spaces always available between the door and the window glass 12 as plainly shown.

U-shaped spring clips 13 preferably covered with non-abrasive cushion sleeves project upwardly and downwardly from the front of the plates 2 and 8 respectively and then engage the adjacent outer surfaces of the door. The plate ends of the clips are formed with horizontally spaced legs 14 which extend across the plates 2 and 8 and rest on the faces thereof opposite the pads and to the sides of the casing members, said plates being wider than the casing, as shown in Figure 4. This arrangement not only gives the cushion pads greater door engaging area, but provides for the convenient mounting of the clip legs. Said legs are clamped against the plates for horizontal adjustment transversely of the vehicle by cooperating clamping plates 15 secured to said casing plates by bolts 16, and between which the legs project.

It will thus be seen that the casing structure may be adjusted to fit any size window opening and may be then rigidly secured against undesired movement.

Adapted when not in use to fit in the casing 1 and to be swung therefrom to an operative position is a signal element. This comprises a vehicle arm 17—a strip-like member disposed centrally of and parallel to the sides of the casing—and a cross flange 18 extending along the upper or front edge of said arm and rigid therewith. The signal arm unit is therefore of T-shaped form, being light and strong. The flange 18 not only reinforces the arm, but when said arm is depending vertically and is inside the casing it then forms a closure for the open front of the main casing 1; the signal arm itself being substantially as long as said casing. The flange 18 is formed with inturned beads 19 or the like along its side edges which are adapted to seat in cushion lined groove members 20 provided along the side edges of the casing 1 at the front as shown.

When not in use therefore the signal arm and all mechanism within the casing are concealed and protected, the cooperating beads and grooves preventing rain from penetrating into the casing. The signal arm is supported from the casing for swinging movement into and out of the same in a vertical plane transversely of the vehicle, by a hinge connection 21 between the top plate 2 at the front and the adjacent end of the flange 18.

The mechanism to control the movement of the signal arm from the interior of the vehicle is arranged as follows:

Mounted on a channel shaped bracket 22 set within the housing 1 adjacent the top is a cross shaft 23, on which is turnable the inner end of a lever 24 of U-shaped section. The outer end of this lever carries a cross pin 25 riding in a longitudinal slot 26 in the arm 17 adjacent the flange 18; the pin having rollers 27 on opposite sides of the arm which engage the under side of the flange 18. Swinging the lever outwardly and upwardly from an inoperative depending position therefore will raise the signal arm also, the rollers then moving along the flange 18 since the pivotal points of the lever and signal arm are horizontally spaced.

This movement of the lever is accomplished as follows:

Projecting between the sides of and pivoted on the lever 24 above the pin 23 are the forked ends of a rigid operating arm 28. This projects from the lever through the back of the casing with a downward curvature and slidably rides on the outer edge of a rigid lip 29 which projects from and is integral with the top of the bracket 22 at the back thereof. The arm beyond its curved portion is bent inwardly of the vehicle in the form of a flat extension 28a serving as a hand grip for engagement by the operator.

Intermediate its ends the upper surface of the curved portion of the arm is formed with spaced ratchet teeth 30 adapted to be separately engaged, when the signal arm is raised either to a horizontal or an upwardly angled position, by a cross element 31 constituting a pawl. This element extends between the adjacent ends of spring members 32 tending to swing downwardly and disposed on opposite sides of the arm 28.

Said members at their lower ends are clamped on a plate 33 which is bolted to the back of the casing outside the same and just under the lip 29 in connection with the holding bolt 34 of the bracket 22. Shims 35 are disposed between the plate and casing, and it will be seen that by altering the number of shims the distance of the pawl element 31 from the back of the casing will be altered. In this manner the position of the pawl element to the ratchet teeth 30 may be altered, enabling adjustments to be made if necessary and depending on the lateral slope of the door to insure that the signal arm when raised to indicate a left turn will be actually horizontal.

To release the spring pawl I provide a U-shaped trip member 36 having upstanding legs disposed to the sides of the arm 28 and projecting through holes 37 in the lip 29 near its outer end (see Figure 5). Above the lip the legs are looped about the element 31 adjacent the legs 32 so that upward pressure on the lower end of the trip will raise the pawl clear of either tooth with which it may be engaged. By thus releasing the arm 28 from holding engagement with the pawl, the signal arm is likewise released and may drop of itself to its normal neutral or inoperative position.

To raise the signal arm it is only necessary to press or pull down on the arm extension 28a. This exerts an upward pull on the lever 24 at the point of connection of the lever with said arm, the curved portion of the arm riding on the outer edge of the lip 29. As soon as the signal arm has assumed the desired signaling position the pawl element 31 automatically engages the corresponding tooth 30 and holds the operating and signal arms against retractive movement as will be obvious.

It is to be noted that the plates 2 and 8 and the lips 3 and 9 are disposed inwardly of the inner face or back of the casing members, so that nothing interferes with the closing of the window as far as the lip 29. Complete closing of the window may be had by notching the same at its upper edge to a depth and width sufficient to clear the lip and the spring legs 32.

The casing and its mounting structure above described is for use when the device is made as an attachment to be installed on a vehicle after manufacture of the latter.

However, if the signal is put out as factory equipment, the casing or recess for the signal would preferably be made integral with the vehicle, being either provided in a post or in the door.

Such an arrangement is shown in Figure 6.

From this figure it will be noted that while the signal itself, as well as its control mechanism, are identical with the structure previously described, the extensible casing and the mounting elements thereon are, however, omitted; the signal receiving space of the casing being instead formed as a recess R in a special post P or in the door or adjacent part. The casing plate 2, having the signal hinge element thereon, is replaced by a separate plate 2a, secured in any suitable manner against the top wall or ceiling of the recess.

In connection with the operation of the signal in either case, it may be noted that the ratchet teeth are rounded on their edges, as shown in Fig. 6. This allows the spring pawl to be forced out of the teeth by upward pressure on the lever 28 if desired, without manual release of the pawl by manipulation of the trip 36.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A direction signal for a motor vehicle having a window opening and a window pane therein, said signal comprising a vertical casing unit which includes a pair of members adjustably connected together for longitudinal extending and contracting movement, a signal arm mounted on the casing, and instrumentalities on opposite ends of the members for releasable holding engagement with the horizontal edges and the adjacent vertical surfaces of the borders along the vehicle window-opening outwardly of the window pane.

2. A direction signal for a motor vehicle having a window opening and a window pane therein, said signal comprising a vertical casing unit which includes a pair of members adjustably connected together for longitudinal extending and contracting movement, a signal arm mounted on the casing, and means at the top and bottom of the casing unit to secure the same on the vehicle at the top and bottom of the window opening therein and outwardly of the window pane.

3. A direction signal comprising a vertical casing unit which includes a pair of members adjustably connected together for longitudinal extending and contracting movement, a signal arm mounted on the casing, horizontal pads on opposite ends of the casing unit adapted to abut against the opposed horizontal surfaces of the borders along a vehicle window opening, lips along the inner edges of the pads to project alongside the inner vertical edges of said borders, and spring clips mounted on said casing units to engage the outer faces of said borders.

4. A structure as in claim 3, with means mounting the clips for horizontal adjustment.

5. A direction signal comprising a vertical channel shaped casing, means to mount the casing on a motor vehicle, a signal arm pivoted at its upper end on the top of the casing at the front, a lever in the casing, means pivoting the lever at its inner and upper end in the casing in transversely spaced relation to the arm pivot, the lever at its opposite end having means slidably engaging the arm whereby turning of the lever on its pivot in one direction will raise the arm, and means including a manually depressible arm projecting inwardly of the casing from adjacent the upper end thereof for thus turning the lever.

6. A direction signal comprising a vertical channel shaped casing, means to mount the casing on a motor vehicle, a signal arm pivoted at its upper end on the top of the casing at the front; a lever pivoted at one end in the casing, a manually operable arm connected to the lever above the pivot thereof and projecting inwardly from the casing adjacent the upper end thereof, the inward portion of the arm being formed with a downward curvature, the lever at its opposite end having means slidably engaging the arm whereby turning of the lever on its pivot in one direction will raise the arm, a lip rigid with and projecting from the casing below the arm and against the outer end of which the under side of the arm slidably bears, spaced teeth formed on the upper surface of the curved portion of the arm outwardly of the casing, and a spring pawl mounted on the casing to engage the teeth in order only after the arm has been moved different distances from a predetermined neutral position.

7. A structure as in claim 6, with means to adjust the pawl horizontally.

8. A structure as in claim 6, with means operable from below the lip for releasing the pawl.

9. A direction signal for a motor vehicle having a window opening and a window pane therein, said signal comprising a vertical casing extending between the top and bottom borders of the window opening outwardly of the window pane, a signal arm pivoted in the casing, and instrumentalities at the top and bottom of the casing releasably engaged with the window-opening border surfaces.

10. A structure as in claim 9, in which said instrumentalities are vertically movable relative to each other whereby to adapt the signal to window openings of different depths.

WILLIAM A. DILLON.